No. 689,473. Patented Dec. 24, 1901.
E. R. EDSON.
PROCESS OF OBTAINING A GELATIN YIELDABLE LIQUID FROM FISH OR OTHER MATERIAL.
(Application filed July 12, 1901.)
(No Model.)
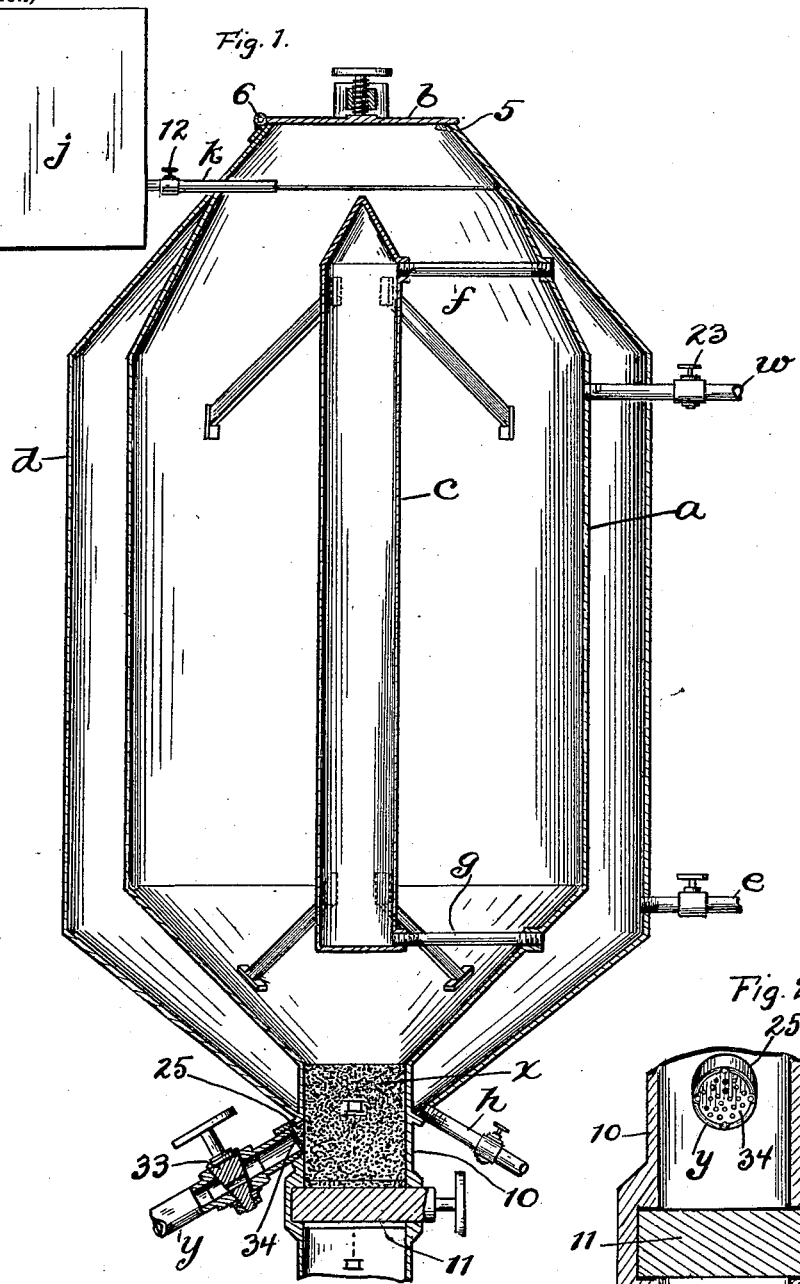
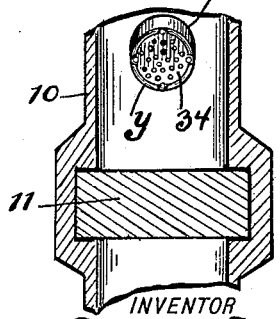
WITNESSES:
Daniel E. Daly.
A. H. Parrett
INVENTOR
Eugene R. Edson
BY Lynch & Dorer
his ATTORNEYS
THE NORRIS PETERS CO., PHOTO-LITHO., WASHINGTON, D. C.

UNITED STATES PATENT OFFICE.

EUGENE R. EDSON, OF CLEVELAND, OHIO.

PROCESS OF OBTAINING A GELATIN-YIELDABLE LIQUID FROM FISH OR OTHER MATERIAL.

SPECIFICATION forming part of Letters Patent No. 689,473, dated December 24, 1901.

Application filed July 12, 1901. Serial No. 67,970. (No specimens.)

*To all whom it may concern:*

Be it known that I, EUGENE R. EDSON, a resident of Cleveland, in the county of Cuyahoga and State of Ohio, have invented certain new and useful Improvements in Obtaining Congealable Gelatin-Yieldable Liquid from Fish or other Material; and I do hereby declare the following to be a full, clear, and exact description of the invention, such as will enable others skilled in the art to which it pertains to make and use the same.

This invention relates to improvements in producing or rendering fish or fish waste or other gelatin-yieldable material to obtain a congealable gelatin-yieldable liquid.

One object of this invention is to obtain a congealable gelatin-yieldable liquid from material of the character indicated by treating the material under pneumatic pressure within a closed receptacle and by the pressure upon the material undergoing treatment, preventing ebullition or agitation of the mass by the heat or from fermentation within the mass and facilitating not only the flow of the gelatin-yieldable liquid from the receptacle, but the extraction of the said liquid from the material undergoing treatment.

Another and important object is to establish a flow of gelatin-yieldable liquid from the receptacle while the mass within the receptacle is heated under a pneumatic pressure, so that the capacity of the gelatin-yieldable liquid thus continuously permitted to flow from the receptacle during the treatment of the material within the receptacle to congeal is not destroyed or injured.

Another object of the invention is to filter the gelatin-yieldable liquid after the extraction of the same from the mass of material undergoing treatment while the same is still heated to a temperature high enough to prevent fermentation of foreign matter or impurities in the liquid before the drainage of the liquid from the apparatus.

With these objects in view the invention consists in the steps or peculiarities hereinafter described, and pointed out in the claims.

In the accompanying drawings, Figure I is a side elevation, largely in section, of apparatus suitable for carrying out the improved process which constitutes the subject-matter of this application. Fig. II is an enlarged vertical section on line II II, Fig. I, looking in the direction indicated by the arrow with the filtering material $x$ omitted.

Referring to the drawings, $a$ designates a vertically-arranged upright receptacle, into which the gelatin-yieldable material—fish waste or other matter—is introduced for treatment to extract or flow gelatin-yieldable liquid from the material. The receptacle $a$ is closed, being provided at its upper end and centrally with a manhole or charging aperture or inlet 5 and a cover $b$, which is arranged to close the said inlet and hinged at one side, as at 6, to the body portion of the receptacle. The material requiring treatment is introduced into the receptacle at the inlet 5. The cover $b$ is secured in its closed position in any approved manner.

The receptacle $a$ is provided centrally with a core-forming heating-drum $c$, which is arranged vertically and extends from near the upper end to near the lower end of the receptacle. The drum $c$ is supported in any approved manner from the receptacle $a$.

A closed heating-jacket $d$ surrounds the receptacle $a$ and extends from the upper end to and below the lower end of the receptacle $a$. The jacket $d$ comprises a casing whose chamber surrounds the receptacle $a$ and is in open relation at its lower end with a valved pipe $e$ for supplying the heating agent—steam or whatever it may be—to the said chamber. The chamber of the jacket $d$ is connected by pipes $f$ and $g$ with the upper end and lower end, respectively, of the chamber of the drum $c$. The connections of the drum $c$ and the jacket $d$ by the pipes $f$ and $g$ establish circulation through the said drum and pipes, so as to cause the fluid within the chambers of the drum and jacket to be maintained at a uniform temperature. The jacket $d$ is preferably provided at its lower extremity with a valved drain-pipe $h$.

The receptacle $a$ is provided at its lower end and centrally with a downwardly-extending valved pipe 10, at which is discharged the residue remaining after the drainage of the gelatin-yieldable liquid from a material treated within the said receptacle. The valve 11 of the outlet 10 is a slide-valve, which is normally closed.

The valved pipe $k$, arranged to discharge into the upper portion of the receptacle $a$, leads from a compressed-air reservoir $j$, into which compressed air or other aeriform or gaseous fluid under pressure is stored. The valve 12 of the pipe $k$ is normally closed.

A valved water-supply pipe $w$ extends through the jacket $d$ and is arranged to discharge into the receptacle $a$. The valve 23 of the pipe $w$ is normally closed. If the moisture contained within the material undergoing treatment is not sufficient in quantity to enable a satisfactory extraction or flowing from the material undergoing treatment of the glue or gelatin contained in the material, additional moisture is supplied by opening the valve 23 of the pipe $w$, so as to permit water to flow from the said pipe into the receptacle $a$.

The slide-valve 11 of the pipe 10 is located a suitable distance below the upper end of the pipe, outside of and below the jacket $b$, and the said pipe is filled or supplied between the said valve and its upper extremity with filtering material $x$. The pipe 10, between its valve 11 and its upper extremity, is provided with a lateral aperture 25, which is in open relation with the drain-pipe $y$. The pipe $y$ is provided with a valve 33 for establishing or interrupting continuity in the passage-way through the said pipe. The valve 33 is normally open, so that the gelatin-yieldable liquid extracted from the material undergoing treatment within the receptacle $a$ can freely drain from the said receptacle through the pipe $y$.

Obviously by the construction hereinbefore described the gelatin-yieldable liquid is filtered before it reaches the pipe $y$, and a screen 34, suitably applied at the receiving end of the pipe $y$, prevents ingress of any large particles of filtering material from the pipe 10 into the said pipe $y$.

By the extension of the heating-jacket to and around the filtering-material-containing portion of the discharge-pipe 10 the gelatin-yieldable liquid is maintained adequately heated until it is filtered, being exposed to a high enough heat to prevent fermentation until foreign matter or impurities have been removed from the said liquid by the filtering material.

Obviously the filtering material within the pipe 10 upon opening the valve 11 after the treatment of a body of material within the receptacle $a$ is discharged with the residue from the said pipe.

The pipe $k$ has its discharging end arranged to discharge laterally into the chamber of the receptacle $a$, as indicated by the arrow, so as to avoid stirring the mass within the said receptacle during the supply of pressure to the receptacle.

In operating the apparatus the cover $b$ of the receptacle $a$ is opened and material requiring treatment is introduced at the inlet 5. The receptacle $a$ is filled with material from the inlet 5 to the upper end of the drum $c$ and then the cover $b$ is closed. The valve 8 of the pipe $e$ is opened so as to supply steam or heating fluid to the chamber of the jacket $d$ and by means of the pipes $f$ and $g$ to the chamber of the drum $c$. Steam is preferably employed, and a pressure of steam sufficient to heat the mass within the receptacle $a$ quickly and thoroughly to more than 212° Fahrenheit—say a pressure of about fifteen pounds—may be employed; but so high a pressure of steam would, unless the mass were kept quiet by some other agency, result in heating and agitating the mass to such an extent as to result in a destruction of or injury to the capacity of the gelatin-yieldable liquid to congeal after the drainage of the said liquid from the receptacle, and consequently air or other aeriform or gaseous fluid under sufficient pressure is admitted to the receptacle $a$, preferably on top of the mass within the said receptacle, by the pipe $k$ upon opening the valve 12 of the said pipe. An adequate pressure of air or other aeriform or gaseous body admitted upon top of the mass within the receptacle $a$ has been found neccessary to prevent an ebullition or agitation of the mass by the heat or fermentation within the mass, and a pneumatic pressure of twenty pounds per square inch on top of the mass has been found efficient against fifteen pounds of steam-pressure employed in heating the mass. Fish or fish waste is more liquid than solid, and the gelatin-yieldable liquid and any oil contained in the said material become readily liberated during the treatment of the material within the receptacle $a$. The oil rises and accumulates on top of the mass within the said receptacle and can be removed, if desired, in any approved manner. The gelatin-yieldable liquid accumulates in the main next to the surrounding wall of the chamber of the receptacle $a$ and flows downwardly to and through filtering material $x$ within the pipe 10, and thence escapes through the drain-pipe $y$. Obviously, therefore, a pneumatic pressure upon the mass of material undergoing treatment to prevent ebullition or agitation of the mass avoids an emulsification of the oil extracted from the material undergoing treatment when the said material contains oil in addition to the gelatin-yieldable liquid. Of course some fish material—as, for instance, the scales, fins, and tails—are completely or substantially oilless. The pneumatic pressure employed in the treatment of the gelatin-yieldable material is placed upon the mass before the mass is heated, so as to positively avoid any ebullition or agitation of the mass. It will be observed also that the material undergoing treatment within the receptacle $a$ is heated by heat radiating outwardly through the mass from the drum $c$ and by heat radiating inwardly through the mass from the jacket $d$, so that the mass is quickly heated.

The valve 33 of the pipe $y$ can be closed, of course, if it is not desired to obtain a gelatin-yieldable liquid which is congealable; but the primary object of the process which constitutes the subject-matter of this application is to obtain a gelatin-yieldable liquid which can be congealed and then dried and sliced to form a dry solid marketable product, and I have discovered that this last-mentioned product cannot be obtained from gelatin-yieldable liquid which has been exposed to a temperature as high or higher than 212° Fahrenheit unless the extracted gelatin-yieldable liquid is permitted to freely drain from the receptacle *a* while the material within the said receptacle is undergoing treatment.

The apparatus disclosed in this application constitutes the subject-matter claimed in a copending application filed May 10, 1901, and serially numbered 59,695.

What I claim is—

1. An improvement in the production of congealable gelatin-yieldable liquid from gelatin-yieldable material, comprising the heating of the material within a closed receptacle under pneumatic pressure high enough to prevent ebullition or agitation of the mass during the treatment of the material, and draining or flowing gelatin-yieldable liquid from the receptacle during the heating of the aforesaid material under pressure, substantially as and for the purpose set forth.

2. An improvement in the production of congealable gelatin-yieldable liquid from gelatin-yieldable material, comprising the treatment of the material within a closed receptacle at a temperature as high as 212° Fahrenheit, subjecting the mass, preparatory to the treatment of the same with heat as aforesaid, to a pressure high enough to prevent ebullition or agitation of the mass and maintaining the said pressure upon the mass during the treatment of the material, and draining or flowing gelatin-yieldable liquid from the receptacle during the treatment of the material with heat and under pressure as aforesaid.

3. An improvement in the production of congealable gelatin-yieldable liquid from gelatin-yieldable material, comprising the heating of the material within a closed receptacle, placing enough pressure upon the mass to prevent ebullition or agitation of the mass during the treatment of the material, drawing gelatin-yieldable liquid from the receptacle during the treatment of the material, filtering the solution during the draining period and maintaining the liquid adequately heated preparatory to and during the filtering operation so as to prevent fermentation of the liquid before the liquid has been filtered.

4. An improvement in the production of congealable gelatin-yieldable liquid from gelatin-yieldable material, comprising the treatment of the material within a closed receptacle at a temperature as high as 212° Fahrenheit, placing enough pressure upon the mass to prevent ebullition or agitation of the mass during the treatment of the material, draining gelatin-yieldable liquid from the lower end of the receptacle during the treatment of the aforesaid material under pressure, filtering the solution during the draining period and maintaining the liquid adequately heated preparatory to and during the filtering operation so as to prevent fermentation of the liquid before the liquid has been filtered.

Signed by me at Cleveland, Ohio, this 2d day of May, 1901.

EUGENE R. EDSON.

Witnesses:
C. H. DORER,
A. H. PARRATT.